United States Patent
Parvanov et al.

(10) Patent No.: US 12,379,944 B2
(45) Date of Patent: Aug. 5, 2025

(54) EXECUTION ENGINE INTEGRATION FRAMEWORK FOR BYZANTINE FAULT TOLERANT (BFT) STATE MACHINE REPLICATION (SMR) SYSTEMS

(71) Applicant: VMware LLC, Palo Alto, CA (US)

(72) Inventors: Teodor Parvanov, Sofia (BG); Celine Jose Nalkara, Bangalore (IN); Tarunkumar Banda, Bangalore (IN); Tsvetomir Dimirov Dimitrov, Sofia (BG); Andrew Joseph Stone, Malden, MA (US)

(73) Assignee: VMware LLC, Palo Alto, CA (US)

( * ) Notice: Subject to any disclaimer, the term of this patent is extended or adjusted under 35 U.S.C. 154(b) by 365 days.

(21) Appl. No.: 18/047,591

(22) Filed: Oct. 18, 2022

(65) Prior Publication Data
US 2024/0126570 A1   Apr. 18, 2024

(51) Int. Cl.
*G06F 9/448* (2018.01)
*G06F 9/54* (2006.01)

(52) U.S. Cl.
CPC .............. *G06F 9/449* (2018.02); *G06F 9/541* (2013.01); *G06F 9/547* (2013.01); *G06F 2209/547* (2013.01)

(58) Field of Classification Search
None
See application file for complete search history.

(56) References Cited

U.S. PATENT DOCUMENTS

| 11,412,040 | B1* | 8/2022 | Shah | H04L 41/40 |
| 2003/0023572 | A1* | 1/2003 | Jowell | G06F 16/243 |
| | | | | 706/45 |
| 2005/0246718 | A1* | 11/2005 | Erlingsson | G06F 9/4411 |
| | | | | 719/317 |
| 2012/0131659 | A1* | 5/2012 | Roy | H04L 9/40 |
| | | | | 709/206 |
| 2020/0334771 | A1* | 10/2020 | Li | H04L 9/0897 |

OTHER PUBLICATIONS

Distler; "Byzantine Fault-tolerant State-machine Replication from a Systems Perspective"; Feb. 11, 2021; ACM Computing Surveys (CSUR); vol. 54, Issue 1, Article No. 24; pp. 1-38. (Year: 2021).*
Tendermint/abci Public Archive, https://github.com/tendermint/abci; 10 pages, downloaded Sep. 23, 2022.

* cited by examiner

*Primary Examiner* — Umut Onat
(74) *Attorney, Agent, or Firm* — Quarles & Brady LLP (57) ABSTRACT

The present invention, in various embodiments, provides a novel execution engine integration framework for a BFT SMR system. With this framework, execution engines for services can be integrated into the BFT SMR system in a generic manner, thereby avoiding the need to implement a custom request handling code for each individual service/execution engine.

21 Claims, 8 Drawing Sheets

EXECUTION ENGINE INTEGRATION FRAMEWORK FOR BYZANTINE FAULT TOLERANT (BFT) STATE MACHINE REPLICATION (SMR) SYSTEMS

BACKGROUND

Unless specifically indicated herein, the approaches described in this section should not be construed as prior art to the claims of the present application and are not admitted to be prior art by inclusion in this section.

State machine replication (SMR) is an approach for building fault-tolerant software services that involves deploying multiple identical server instances, known as replicas, and coordinating interactions between the replicas and clients via a consensus layer to ensure all non-faulty replicas execute client requests in the same order (and thus maintain the same service state). This allows a subset of the replicas to fail without affecting service availability for the clients. Byzantine fault tolerant (BFT) SMR is a type of SMR that can tolerate a threshold number of Byzantine replicas, which are faulty replicas capable of displaying arbitrary behavior. A set of replicas that implement BFT SMR is referred to herein as a BFT SMR system.

Generally speaking, each replica in a BFT SMR system that implements a service S includes, or is communicatively coupled with, an execution engine associated with S. This execution engine is a software component that is typically created by the developer of S and is programmed to (1) receive client requests directed to S in the order determined by the system's consensus layer, (2) execute each received request per the service logic defined for S, and (3) output the results of the request execution. In certain BFT SMR systems, the mechanism by which an execution engine communicates with the consensus layer and with other parts of the system is a custom request handler that is specific to the execution engine (or in other words, specific to the service associated with that execution engine). However, this type of design significantly complicates the process of integrating new services and their associated execution engines into the system.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

Embodiments of the present disclosure are directed to an execution engine integration framework for a BFT SMR system. With this framework, execution engines for services can be integrated into the BFT SMR system in a generic manner, thereby avoiding the need to implement custom request handling code for each individual service/execution engine.

1. Example BFT SMR System and Solution Overview

Figure 1:
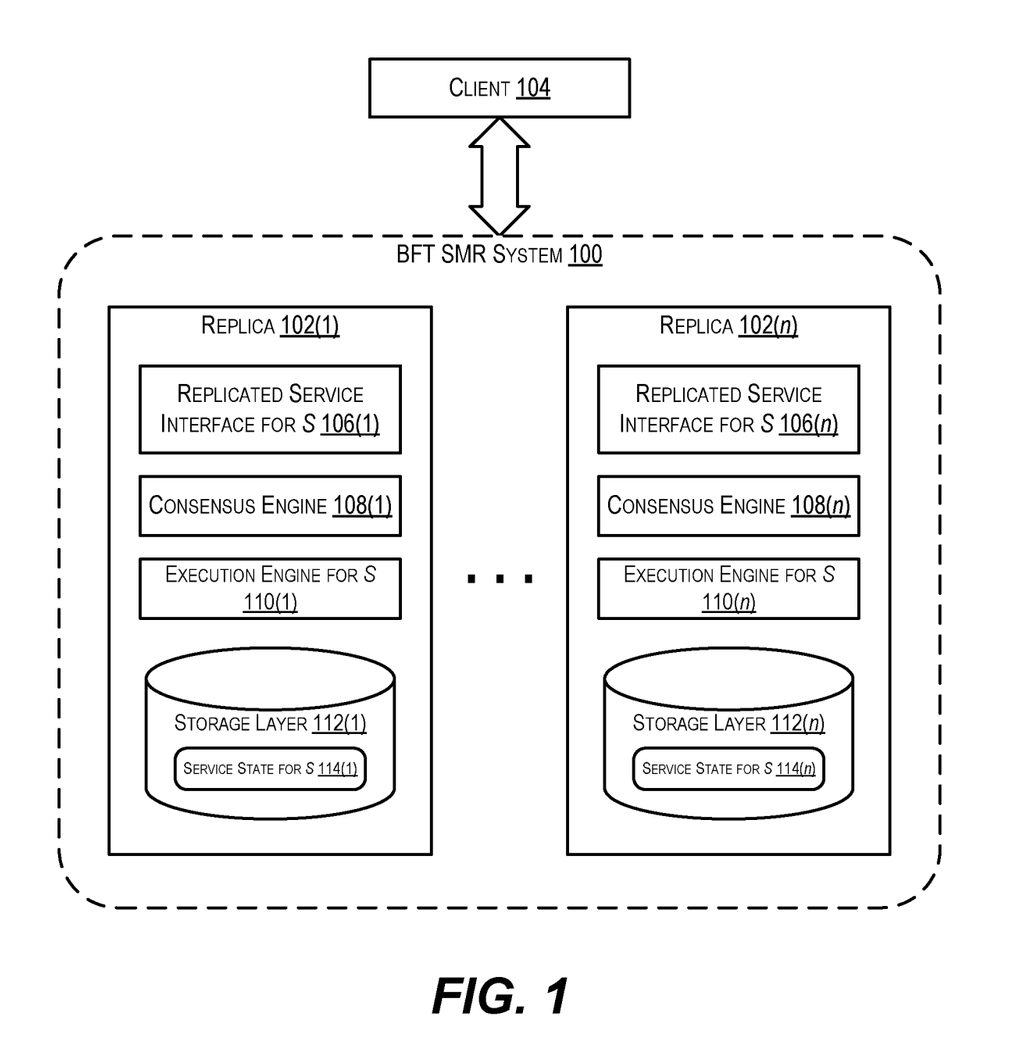
FIG. 1 depicts an example BFT SMR system according to certain embodiments.

FIG. 1 depicts an example BFT SMR system 100 in which the techniques of the present disclosure may be implemented. As shown, system 100 comprises n server replicas 102(1)-(n) (referred to herein as simply replicas) that are communicatively coupled with a client computing system/device 104 (referred to herein as simply a client). Although only a single client is depicted for purposes of illustration, any number of clients may be supported.

Replicas 102(1)-(n) are configured to provide a fault-tolerant software service S to client 104 by receiving service requests from the client (referred to herein as client requests or simply requests) and by replicating the execution of those requests on each replica. Service S may be, e.g., a blockchain service, a banking service, or any other service that maintains and updates persistent data, referred to as service state, in accordance with a state machine paradigm (i.e., a paradigm where the data begins at an initial state and transitions to subsequent states deterministically based on received inputs). To that end, each replica 102 exposes a replicated service interface for S (reference numeral 106) to client 104. In addition, each replica 102 includes a consensus engine 108, an execution engine for S (reference numeral 110), and a storage layer 112 configured to hold the service state for S (reference numeral 114) that is maintained by the replica. Storage layer 112 may be implemented using a blockchain, a key-value store, a relational database, or any other type of data storage structure known in the art.

In operation, the service state for S on each replica 102 is initialized to be the same (i.e., an initial state). Then, as client 104 submits requests to system 100 pertaining to S, the client and replicas interact with each other using a set of protocols to ensure that all non-faulty replicas execute the requests in the same order, thereby keeping the service states of the non-faulty replicas consistent. The actual execution of the client requests is carried out by execution engines 110(1)-(n), which implement the service logic of S.

Figure 2:
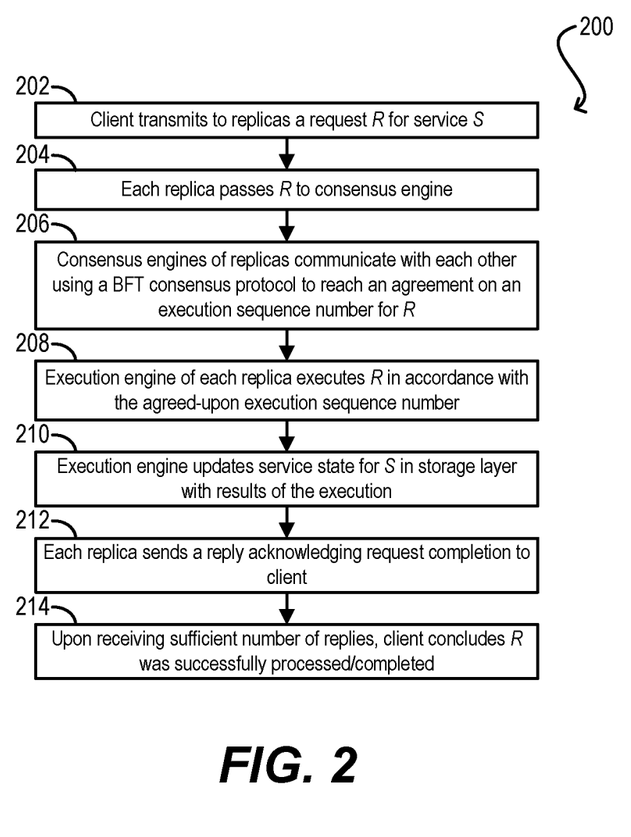
FIG. 2 depicts an example request processing workflow.

To clarify the foregoing, FIG. 2 depicts a high-level request processing workflow 200 that may be performed by client 104 and replicas 102(1)-(n) according to certain embodiments. Starting with step 202, client 104 transmits to each replica 102 a request R pertaining to service S. Because the replicas may not receive R in the same order relative to other requests sent by client 104 and/or other clients, each replica 102 passes R to its consensus engine 108 (step 204) and the consensus engines (which collectively form a consensus layer) communicate with each other using a BFT consensus protocol to reach an agreement on an execution sequence number for the request (step 206). For example, the consensus engines may agree to execute R as the 100th request out of all incoming client requests.

Once a consensus on the execution sequence number for R is reached, execution engine 110 of each replica 102 independently executes R based on that ordering (step 208) and updates the service state for S held in storage layer 112 with the results of the execution (step 210). Further, the replica sends a reply acknowledging completion of the request to client 104 (step 212). Finally, upon receiving a sufficient number of replies from the replicas, client 104 concludes that R was successfully processed/completed (step 214) and the workflow ends.

Figure 3:
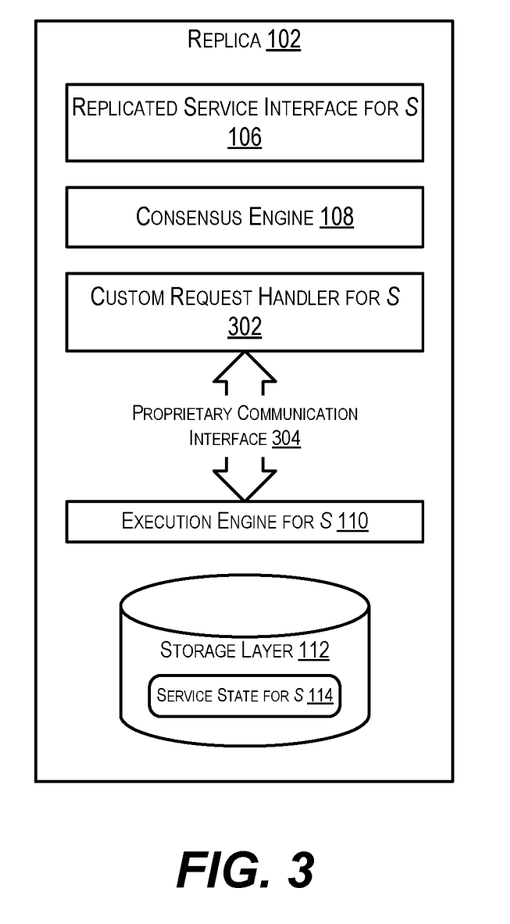
FIG. 3 depicts a replica of the BFT SMR system of FIG. 1 according to certain embodiments.

As mentioned in the Background section, in some BFT SMR systems, the mechanism by which the execution engine for a service communicates with the rest of the system is a custom request handler that is specific to that service/execution engine. By way of example, FIG. 3 depicts a more detailed representation of each replica 102 from system 100 of FIG. 1 in the scenario where system 100 employs such an architecture. As shown in FIG. 3, replica 102 includes a custom request handler 302 that is specific to service S and that communicates with execution engine 110 of S via a proprietary communication interface 304. Through this proprietary communication interface, custom request handler 302 can enable execution engine 110 to carry out its designated functions. For instance, custom request handler 302 can use proprietary communication interface 304 to pass client requests for S to engine 110 for execution. Custom request handler 302 can also use proprietary communication interface 304 to fulfill requests from engine 110 for information from storage layer 112/service state 114 that may be needed for request execution, as well as to receive execution results from engine 110 that should be persisted in storage layer 112/service state 114, However, a significant problem with the architecture shown in FIG. 3 is that it requires the implementation of a brand new custom request handler and corresponding proprietary communication interface for each new service/execution engine to be integrated into system 100. This is because custom request handler 302 and proprietary communication interface 304 are specific to service S/execution engine 110 and thus cannot be reused for communication with the execution engines of other services. Accordingly, the architecture of FIG. 3 imposes a substantial burden on developers that wish to replace an existing execution engine in system 100 and/or extend the system with additional execution engines.

Figure 4:
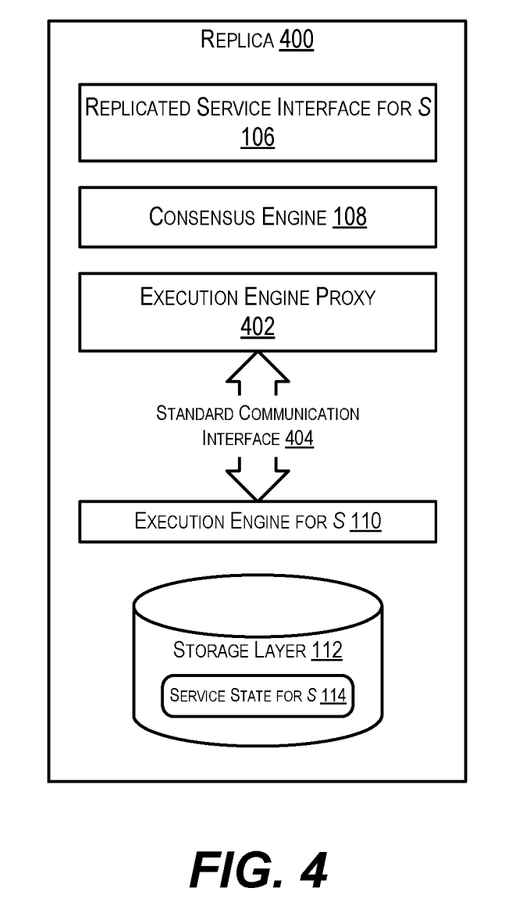
FIG. 4 depicts an enhanced version of the replica of FIG. 3 that implements the framework of the present disclosure according to certain embodiments.

To address the foregoing and other related problems, FIG. 4 depicts an enhanced version of replica 102 of FIG. 3 (i.e., replica 400) that implements a novel execution engine integration (EEI) framework according to certain embodiments. As shown in FIG. 4, this EEI framework includes, among other things, a new execution engine proxy 402 in place of custom request handler 302 for service S and a new standard communication interface 404 between proxy 402 and execution engine 110 for S in place of proprietary communication interface 304.

In various embodiments, standard communication interface 404 comprises a generic set of application programming interfaces (APIs) or message types that cover most or all operations needed by replica 400 to communicate with a typical execution engine (and vice versa). For example, the following is a sample list of APIs that may be included in standard communication interface 404 and a brief description of each according to a particular embodiment. This list assumes that storage layer 112 is implemented using a key-value store.

ExecuteRequest(request r)—Sends to execution engine a client request r for execution
ReadKeys(keys k)—Sends to replica a request to read the values of keys k from storage layer
ReturnKeyValues(key-value pairs kv)—Returns to execution engine the key-value pairs kv requested via ReadKeys
ReturnExecutionResult(readset rs, writeset ws)—Returns to replica an execution result for a client request comprising a "readset" of key-value pairs rs and a "writeset" of key-value pairs ws; writeset ws is persisted to the storage layer if the values of the keys in readset rs are consistent with the corresponding values for those keys in storage layer 112

Further, execution engine proxy 402 is a generic software component that uses standard communication interface 404 (rather than a proprietary interface like interface 304 of FIG. 3) to communicate with execution engine 110 as part of the request processing carried out by replica 400. Because execution engine proxy 402 does not rely on any proprietary APIs or message types specific to execution engine 110/service S, proxy 402 is necessarily independent of engine 110/service S. Stated another way, execution engine proxy 402 can be reused to communicate with any execution engine that also understands standard communication interface 406. In certain embodiments, execution engine proxy 402 can be configured to support one of two different variants of standard communication interface 404 depending on whether the execution engine to which the proxy is connected is implemented as a standalone process or a dynamically linked library/object. In the former case, execution engine proxy 402 can support a variant of standard communication interface 404 that employs an inter-process communication (IPC) mechanism such as remote procedure call (RPC), network sockets, a messaging bus, or the like. In the latter case, execution engine proxy 402 can support a variant of standard communication interface 404 that employs an application binary interface (ABI).

With these framework components in place, a number of advantages are realized. First, in the scenario where a service developer wishes to integrate a new service and its corresponding execution engine into system 100, there is no need for the developer to create a custom request handler and associated proprietary communication interface for that service's execution engine as per the architecture shown in FIG. 3. Instead, the developer can simply design the execution engine to implement standard communication interface 404 and then add it to the system. Execution engine proxy 402 will thereafter automatically know how to communicate with the newly added execution engine because both sides use the same standard interface. Accordingly, this approach significantly streamlines the process of integrating new services/execution engines.

Second, because execution engine proxy 402 supports both IPC and binary variants of standard communication interface 404, the EEI framework of the present disclosure can flexibly accommodate execution engines that are implemented as standalone processes (e.g., separate local or remote containers, etc.) or as dynamically linked libraries/objects. The latter alternative may be useful for integrating services that are directed to the internal operation of system 100, such as a system reconfiguration service.

Third, the ease of integration afforded by the EEI framework opens the door for system 100 to support multiple concurrent services/execution engines. To achieve this in a practical way, in certain embodiments the EEI framework can further include a request orchestrator component that is configured to (1) discover and register new execution engines with the system, and (2) route incoming client requests to the appropriate execution engine for execution. The request orchestrator and its associated functions are detailed in section (3) below.

It should be appreciated that FIGS. 1-4 are illustrative and not intended to limit embodiments of the present disclosure. For example, although FIG. 4 depicts a particular arrangement of EEI framework components within replica 400, other arrangements are possible (e.g., the functionality attributed to a particular component may be split into multiple components, components may be combined, etc.). One of ordinary skill in the art will recognize other variations, modifications, and alternatives.

2. Request Processing Workflow

Figure 5:
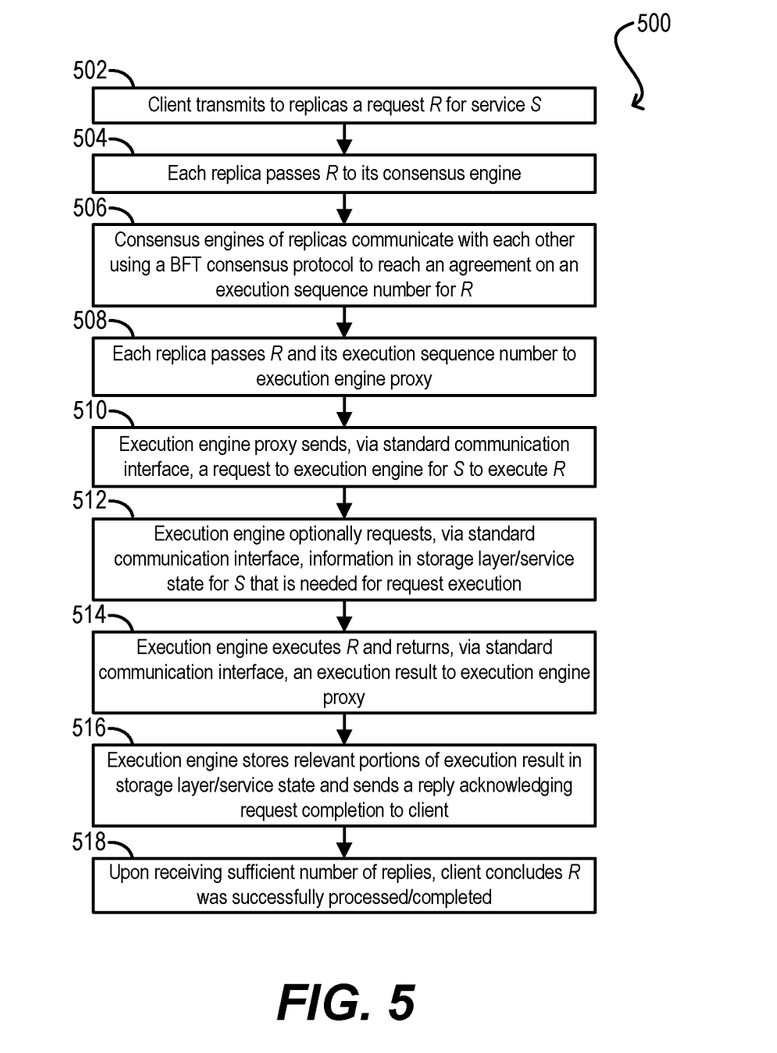
FIG. 5 depicts a request processing workflow per the framework of the present disclosure according to certain embodiments.

FIG. 5 depicts a request processing workflow 500 that may be performed by client 104 and each replica 400 of system 100 using the EEI framework components shown in FIG. 4 according to certain embodiments.

Starting with step 502, client 104 can generate and send to each replica 400 a request R directed to a service implemented by system 100 (i.e., service S). Request R may be, e.g., a request to execute a transaction with respect to S.

At steps 504 and 506, replica 400 can pass R to its consensus engine 108 and the consensus engines can agree upon an execution sequence number for the request. This step is identical to the consensus processing described in steps 204 and 206 of workflow 200.

Once a consensus on the execution sequence number for R is reached, the request and its agreed-upon execution sequence number can be passed to the replica's execution engine proxy 402 (step 508), which can thereafter communicate with execution engine 110 for S using standard communication interface 404 to enable engine 110 to execute R based on the consensus ordering. For example, at step 510, execution engine proxy 402 can send, via standard communication interface 404, a request to execution engine 110 to execute R in accordance with the agreed-upon execution sequence number. Further, at step 512, execution engine 110 can optionally request, via standard communication interface 404, information in storage layer 112/service state 114 (e.g., a set of key-value pairs) that is needed by the execution engine to carry out request execution. Yet further, at step 514, execution engine 110 can execute R and return, via standard communication interface 404, an execution result to execution engine proxy 402.

Upon receiving the execution result, execution engine proxy 402 can store relevant portions of the result in storage layer 112/service state 114 and send a reply acknowledging completion of the request to client 104 (step 516). Finally, upon receiving a sufficient number of replies from the replicas, client 104 can conclude that R was successfully processed/completed (step 518) and the workflow can end.

It should be appreciated that workflow 500 is illustrative and various modifications to the sequencing and/or content of the steps are possible. For example, in some embodiments system 100 may implement a "pre-execution" optimization in which the replicas of the system optimistically execute client requests before being ordered via the consensus layer, thereby potentially accelerating system operation. In these embodiments, request R will initially bypass each replica's consensus engine 108 and be provided to execution engine proxy 402 first for execution via execution engine 110. Once R is executed and its execution result has been obtained, it will be ordered via the consensus layer.

3. Supporting Multiple Concurrent Execution Engines

As noted in section (2) above, one advantage of the EEI framework is that it facilitates the integration of multiple concurrent execution engines within system 100. To illustrate this, FIG. 6 depicts a modified version of replica 400 of FIG. 4 (i.e., replica 600) that supports three concurrent execution engines 602, 604, and 606 (corresponding to services S1, S2, and S3 with service interface 616) via the EEI framework according to certain embodiments.

As shown, each execution engine 602/604/606 is communicatively coupled with a separate runtime instance of execution engine proxy 402 (i.e., proxy instances 608/610/612). Each execution engine proxy instance 608/610/612 and its connected execution engine 602/604/606 are configured to communicate with each other via standard communication interface 404 described previously. In the example of FIG. 6, execution engines 602 and 604 are implemented as separate containers within replica 600 and thus communicate with their respective execution engine proxy instances 608 and 610 via the IPC variant of standard communication interface 404. In contrast, execution engine 606 is implemented as a dynamically linked library (DLL) and thus communicates with its execution engine proxy instance 612 via the binary variant of standard communication interface 404. For example, execution engine 606 may be internally developed execution engine (i.e., an engine created by the developers/maintainers of system 100) that pertains to the management of the system, rather than an externally facing service.

One issue that is created by multiple concurrent execution engines is that the system needs a way to initially discover and register each of these execution engines for inclusion in the system. Manually registering each execution engine is possible but not particularly practical for a real-world deployment where many execution engines may be added and removed over time. Another issue is that the system must be able to route client requests (which will be directed to a particular service S1, S2, or S3) to the correct proxy instance/execution engine for processing.

Figure 6:
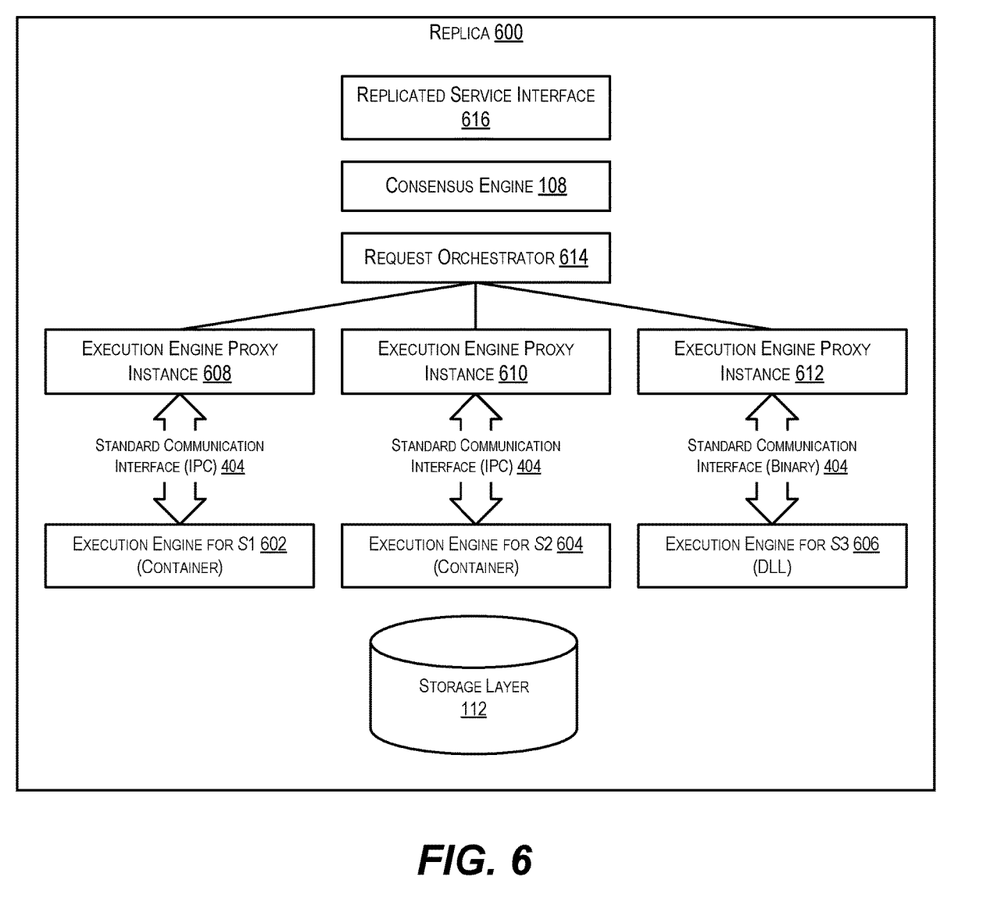
FIG. 6 depicts a replica that supports multiple concurrent execution engines according to certain embodiments.

To address this, each replica 600 of system 100 can further include a request orchestrator 614 as shown in FIG. 6 that is communicatively coupled with execution engine proxy instances 608-612. At a high level, request orchestrator 614 can carry out two processes: a first process for discovering and registering new execution engines that are available for integration, and a second process for routing incoming client requests. Each of these are described in turn below.

3.1 Execution Engine Discovery and Registration

Figure 7:
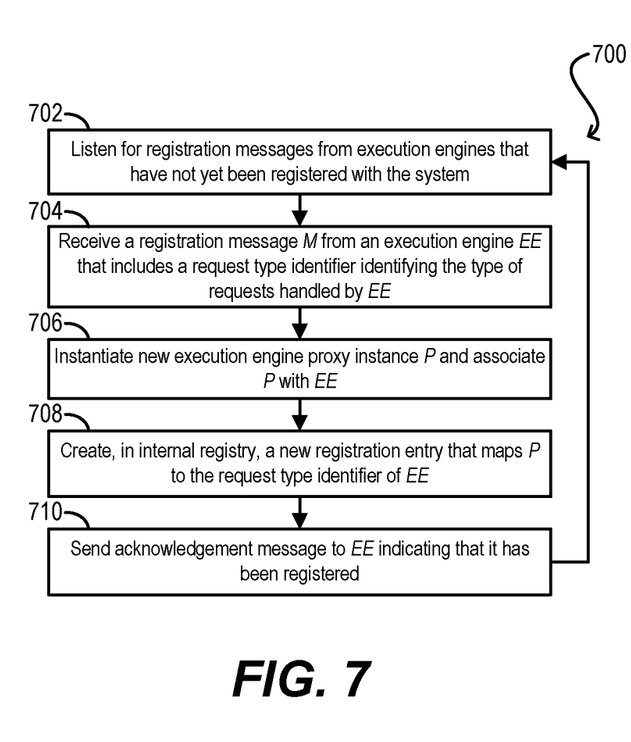
FIG. 7 depicts an execution engine discovery and registration workflow according to certain embodiments.

FIG. 7 depicts an execution engine discovery and registration workflow 700 that may be performed by request orchestrator 614 of replica 600 of FIG. 6 according to certain embodiments.

Starting with step 702, request orchestrator 614 can listen for registration messages from execution engines that have not yet been registered with system 100. After some period of time, request orchestrator 614 can receive a registration message M from an execution engine EE (step 704). Registration message M can include, e.g., an identifier of the type of requests handled by EE, as well as other metadata such as the name of the service associated with EE, information for connecting to EE (e.g., network endpoint address), the type of communication interface supported by EE (e.g., IPC or binary), and so on. In one set of embodiments, the request type identifier included in registration message M can be a uniform resource identifier (URI).

Upon receiving M, request orchestrator 614 can instantiate a new execution engine proxy instance P and associate (i.e., connect) new proxy instance P with EE (step 706). Request orchestrator 614 can further create, in an internal registry, a new registration entry that maps P to the request type identifier of EE included in M.

Finally, at step 708, request orchestrator 614 (as illustrated in FIG. 6) can send an acknowledgement message to EE indicating that it has been successfully registered and return to step 702 to listen for additional registration messages. Step 708 provides creating, in internal registry, a new registration entry that maps P to the request type identifier of EE. Step 710 provides sending acknowledgement message to EE indicating that it has been registered.

3.2 Request Routing

Figure 8:
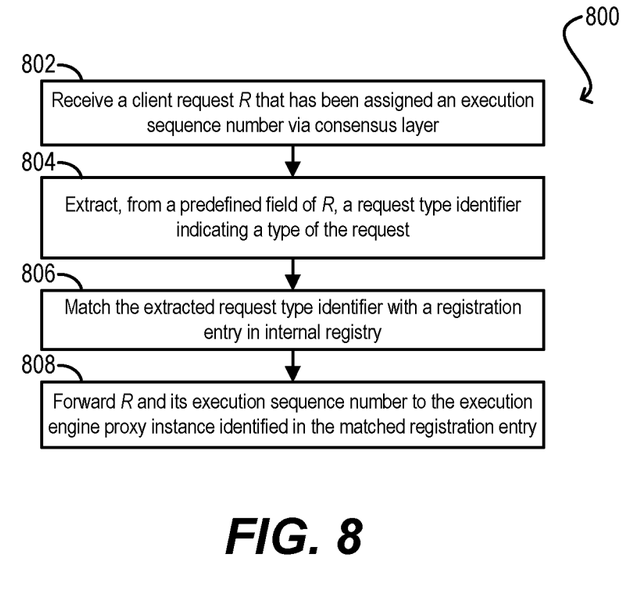
FIG. 8 depicts a request routing workflow according to certain embodiments.

FIG. 8 depicts a request routing workflow 800 that may be performed by request orchestrator 614 of replica 600 of FIG. 6 according to certain embodiments. Workflow 800 assumes that all of the execution engines of the replica (i.e., execution engines 602-606) have been registered per the discovery and registration workflow of FIG. 7.

Starting with step 802, request orchestrator 614 can receive a client request R that has been assigned an execution sequence number via the consensus layer.

At step 804, request orchestrator 614 can extract, from a predefined field of R, a request type identifier indicating the type of the request. In a particular embodiment, R may be wrapped in a protocol buffer (i.e., protobuf) message of type "any" and the predefined field holding the request type identifier may be the "type.URL" field of the protocol buffer message.

At step 806, request orchestrator 614 can match the extracted request type identifier to a particular registration entry in the orchestrator's internal registry. As mentioned previously, the registration entries in this registry include mappings between request type identifiers and execution engine proxy instances that are connected to the execution engines configured to execute those request types. Request orchestrator 614 can then forward R and its execution sequence number to the execution engine proxy instance identified in the matched registration entry (step 808).

Finally, although not shown in the figure, the execution engine proxy instance can process R via its connected execution engine in accordance with steps 508 and onward in workflow 500 of FIG. 5.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
   receiving, by an execution engine proxy running on a replica of a state machine replication (SMR) system, a client request directed to a service implemented by the SMR system; and
   interacting, by the execution engine proxy using a standard communication interface, with an execution engine for the service in order to execute the client request via the execution engine,
   wherein the standard communication interface comprises a set of generic application programming interfaces (APIs) or message types that are independent of the service or to the execution engine.

2. The method of claim 1 wherein the service is a standalone process and wherein the standard communication interface is implemented using an inter-process communication mechanism.

3. The method of claim 1 wherein the service is a dynamically linked library or object and wherein the standard communication interface is implemented using an application binary interface.

4. The method of claim 1 wherein the execution engine proxy is reusable for interacting with other execution engines of other services implemented by the SMR system.

5. The method of claim 1 wherein the interacting comprises:
sending, to the execution engine via the standard communication interface, a request to execute the client request; and
receiving, from the execution engine via the standard communication interface, a result of executing of the client request.

6. The method of claim 1 further comprising, prior to receiving the client request at the execution engine proxy:
receiving, by a request orchestrator running on the replica, a registration message from the execution engine, the registration message including a request type identifier identifying a type of requests handled by the execution engine;
instantiating the execution engine proxy;
associating the execution engine proxy with the execution engine; and
creating a registration entry that maps the execution engine proxy to the request type identifier.

7. The method of claim 6 further comprising, prior to receiving the client request at the execution engine proxy:
extracting, by the request orchestrator, a request type identifier from a predefined field of the client request;
matching the extracted request type identifier with the registration entry; and
forwarding the client request to the execution engine proxy in accordance with the matched registration entry.

8. A non-transitory computer readable storage medium having stored thereon program code executable by a replica of a state machine replication (SMR) system to implement a method, the method comprising:
receiving, by an execution engine proxy running on the replica, a client request directed to a service implemented by the SMR system; and
interacting, by the execution engine proxy using a standard communication interface, with an execution engine for the service in order to execute the client request via the execution engine,
wherein the standard communication interface comprises a set of generic application programming interfaces (APIs) or message types that are independent of the service or to the execution engine.

9. The non-transitory computer readable storage medium of claim 8 wherein the service is a standalone process and wherein the standard communication interface is implemented using an inter-process communication mechanism.

10. The non-transitory computer readable storage medium of claim 8 wherein the service is a dynamically linked library or object and wherein the standard communication interface is implemented using an application binary interface.

11. The non-transitory computer readable storage medium of claim 8 wherein the execution engine proxy is reusable for interacting with other execution engines of other services implemented by the SMR system.

12. The non-transitory computer readable storage medium of claim 8 wherein the interacting comprises:
sending, to the execution engine via the standard communication interface, a request to execute the client request; and
receiving, from the execution engine via the standard communication interface, a result of executing of the client request.

13. The non-transitory computer readable storage medium of claim 8 wherein the method further comprises, prior to receiving the client request at the execution engine proxy:
receiving, by a request orchestrator running on the replica, a registration message from the execution engine, the registration message including a request type identifier identifying a type of requests handled by the execution engine;
instantiating the execution engine proxy;
associating the execution engine proxy with the execution engine; and
creating a registration entry that maps the execution engine proxy to the request type identifier.

14. The non-transitory computer readable storage medium of claim 13 wherein the method further comprises, prior to receiving the client request at the execution engine proxy:
extracting, by the request orchestrator, a request type identifier from a predefined field of the client request;
matching the extracted request type identifier with the registration entry; and
forwarding the client request to the execution engine proxy in accordance with the matched registration entry.

15. A computer system acting as a replica in a state machine replication (SMR) system, the computer system comprising:
a processor;
a storage layer; and
a non-transitory computer readable medium having stored thereon program code that, when executed, causes the processor to:
receive, by an execution engine proxy running on the replica, a client request directed to a service implemented by the SMR system; and
interact, by the execution engine proxy using a standard communication interface, with an execution engine for the service in order to execute the client request via the execution engine,
wherein the standard communication interface comprises a set of generic application programming interfaces (APIs) or message types that are independent of the service or to the execution engine.

16. The computer system of claim 15 wherein the service is a standalone process and wherein the standard communication interface is implemented using an inter-process communication mechanism.

17. The computer system of claim 15 wherein the service is a dynamically linked library or object and wherein the standard communication interface is implemented using an application binary interface.

18. The computer system of claim 15 wherein the execution engine proxy is reusable for interacting with other execution engines of other services implemented by the SMR system.

19. The computer system of claim 15 wherein the interacting comprises:

sending, to the execution engine via the standard communication interface, a request to execute the client request; and receiving, from the execution engine via the standard communication interface, a result of executing of the client request.

20. The computer system of claim 15 wherein the program code further causes the processor to, prior to receiving the client request at the execution engine proxy:

receive a registration message from the execution engine, the registration message including a request type identifier identifying a type of requests handled by the execution engine;

instantiate the execution engine proxy;

associate the execution engine proxy with the execution engine; and create a registration entry that maps the execution engine proxy to the request type identifier.

21. The computer system of claim 20 wherein the program code further causes the processor to, prior to receiving the client request at the execution engine proxy:

extract a request type identifier from a predefined field of the client request;

match the extracted request type identifier with the registration entry; and forward the client request to the execution engine proxy in accordance with the matched registration entry.

\* \* \* \* \*